Sept. 30, 1930.　　V. BOTTKER ET AL　　1,777,069
FISH CLEANING MACHINE
Filed Aug. 13, 1928　　3 Sheets-Sheet 1
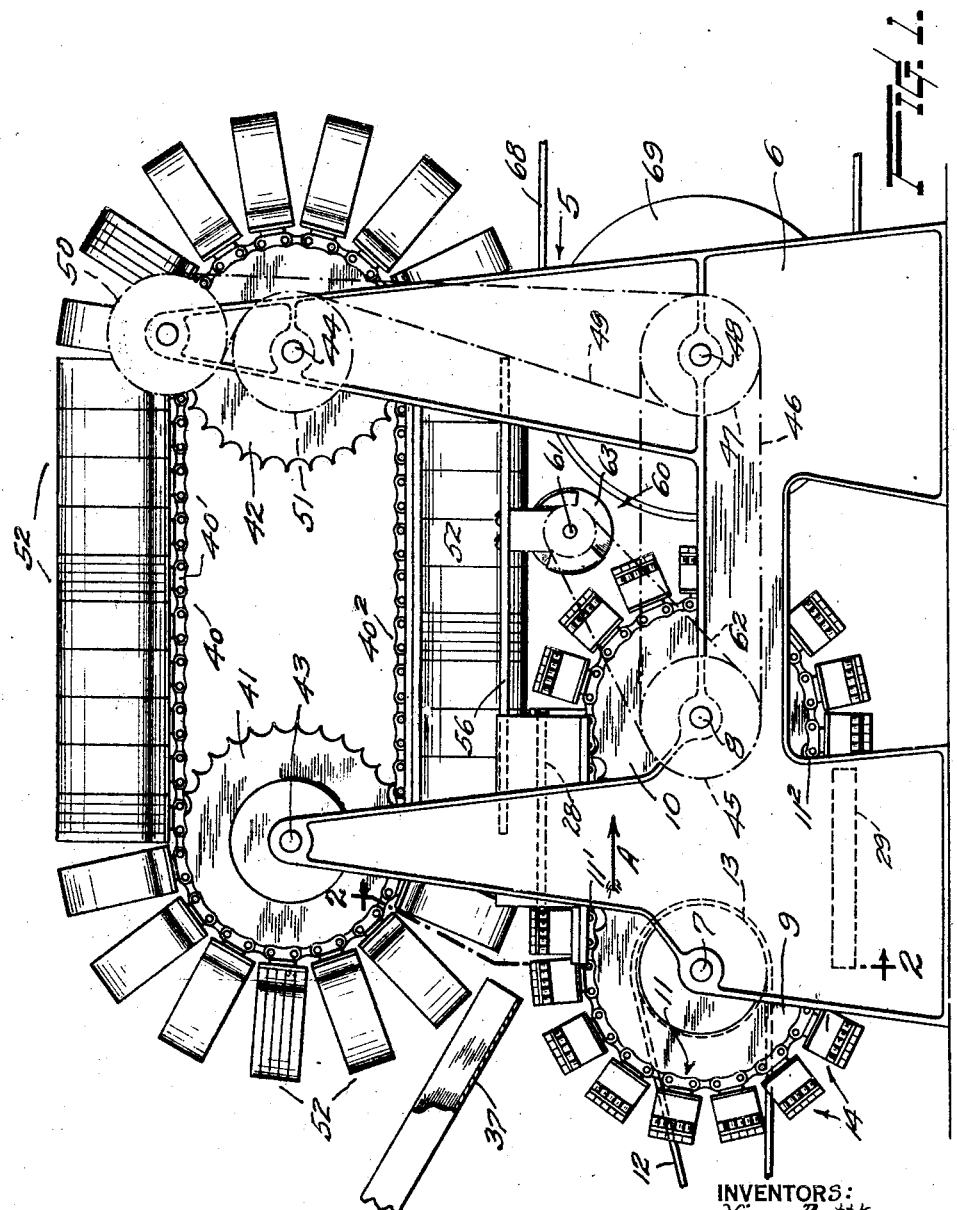
INVENTORS:
Viggo Bottker and
BY Bjarne Grondahl
ATTORNEY Sept. 30, 1930.  V. BOTTKER ET AL  1,777,069
FISH CLEANING MACHINE
Filed Aug. 13, 1928   3 Sheets-Sheet 2
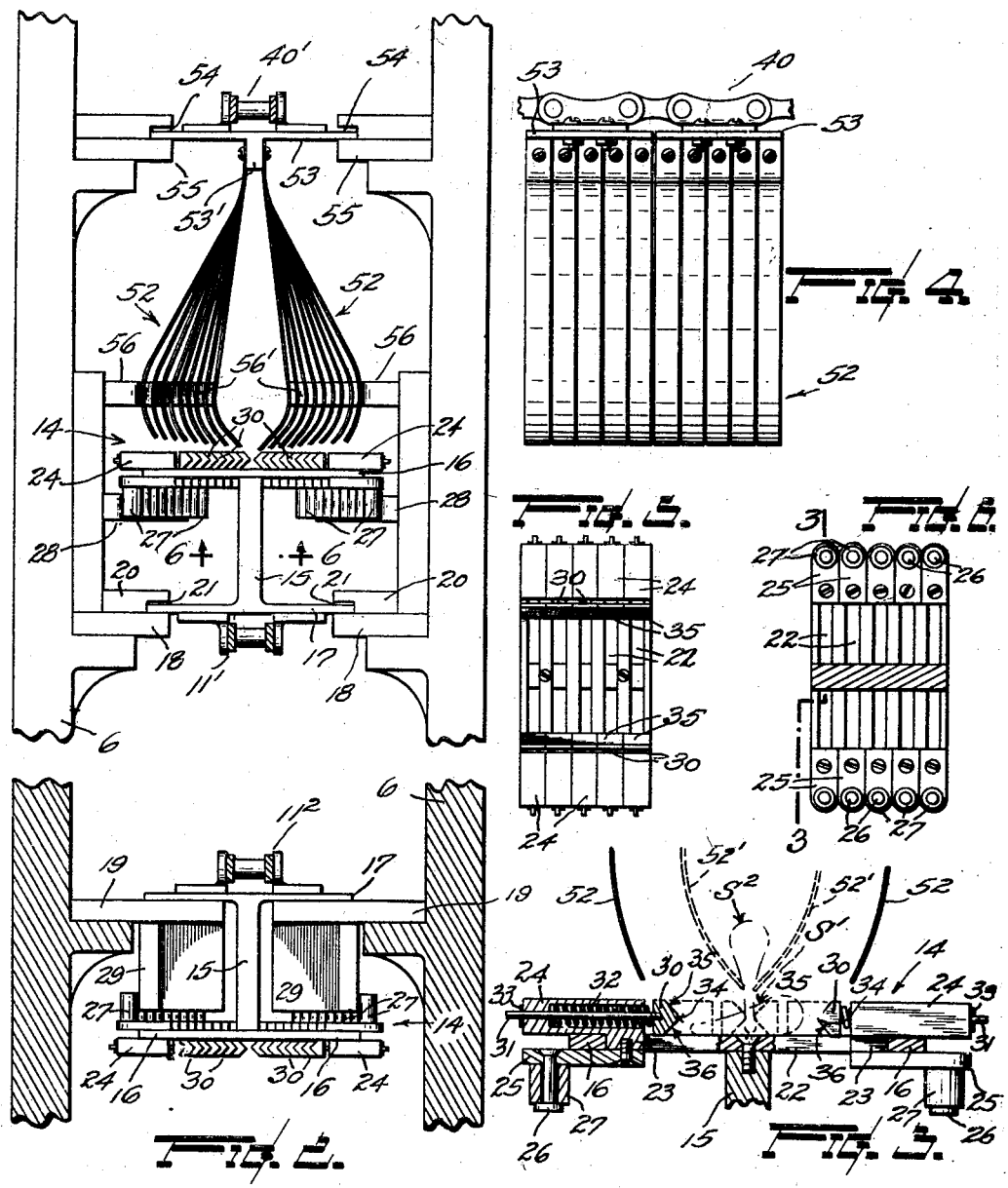
INVENTORS:
Viggo Bottker
BY Bjarne Grøndahl
ATTORNEY Sept. 30, 1930. V. BOTTKER ET AL 1,777,069
FISH CLEANING MACHINE
Filed Aug. 13, 1928 3 Sheets-Sheet 3
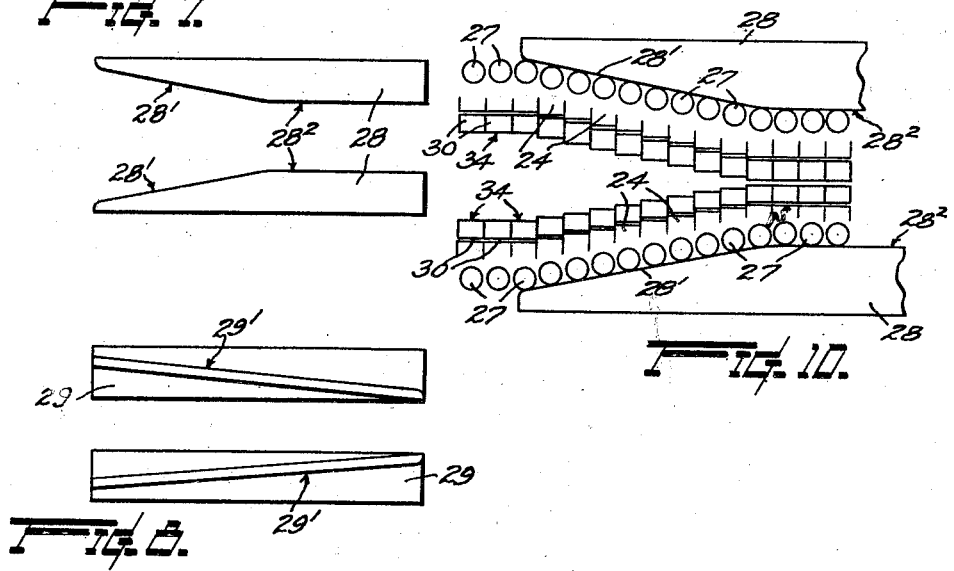
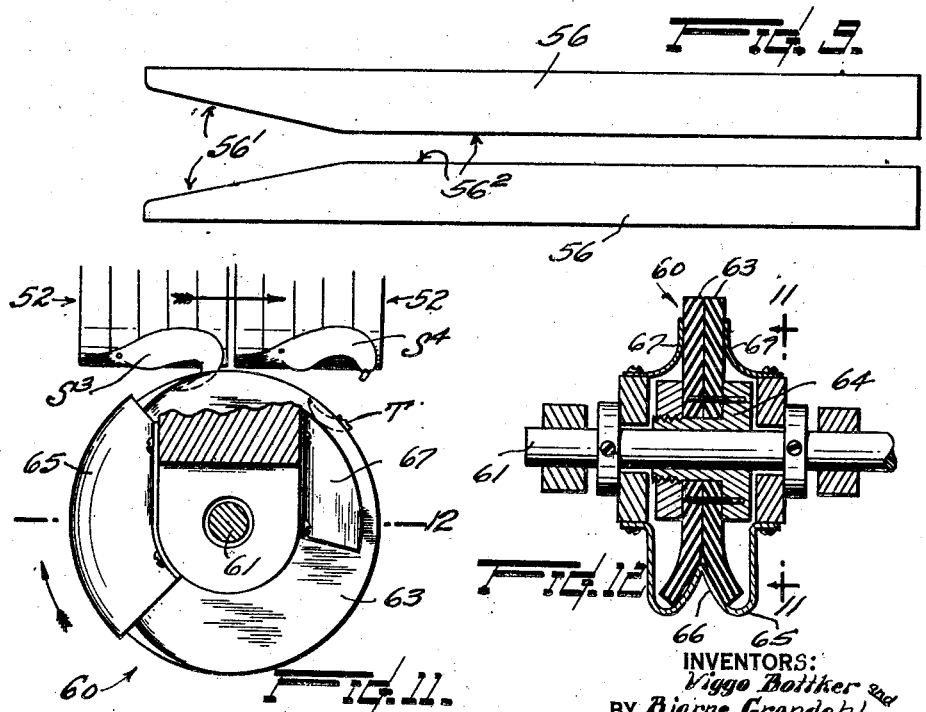
INVENTORS:
Viggo Bottker and
BY Bjarne Grøndahl
ATTORNEY Patented Sept. 30, 1930

1,777,069

UNITED STATES PATENT OFFICE

VIGGO BOTTKER, OF SEATTLE, WASHINGTON, AND BJARNE GRONDAHL, OF WASHINGTON BAY, TERRITORY OF ALASKA

FISH-CLEANING MACHINE

Application filed August 13, 1928. Serial No. 299,222.

This invention relates to devices for cleaning fish and, more especially, the removal of the shell from the tail portion of a shrimp.

Heretofore such operation has been manually performed, the operator holding the shrimp body between the thumb and a finger of one hand, and removing the shell from the tail by means of the thumb and a finger of her other hand.

Because of their small size, the removal of shells from shrimp has proved laborious and expensive.

The object of our invention, generally stated, is to overcome these and other difficulties by the provision of mechanism which will automatically accomplish the removal of portions of the shells of fish in a more efficient and economical manner.

More specific objects and advantages of the invention will appear in the following description.

The invention consists in the novel construction, adaptation and combination of parts hereinafter described and claimed.

In the accompanying drawings,—

Figure 1 is a side elevation of a machine embodying our invention; Fig. 2 is a fragmentary transverse vertical section taken substantially on broken line 2—2 of Fig. 1; Fig. 3 is a transverse vertical section of portions of one of the carrier members of the machine and portions of a pair of gripping fingers in their full open positions, and showing by dotted lines the relatively movable parts of the carrier member and said gripping fingers in their closed positions, a shrimp being indicated by dotted lines in two positions; Fig. 4 is a side elevation of a plurality of gripping fingers and a portion of the chain to which they are connected drawn to a larger scale than shown in Fig. 1; Fig. 5 is a plan view of one of the carrier assemblies; Fig. 6 is a horizontal sectional view of Fig. 5, taken on the line 6—6 of Fig. 2, looking upward; Figs. 7 and 8, respectively, are plan views of the jaw-closing and opening cam-bars; Fig. 9 is a plan view of the cam bars for regulating the action of the gripping fingers; Fig. 10 is a plan view, shown somewhat diagrammatically, of the jaw-closing cam bars shown in Fig. 7 and series of jaws regulated thereby through the medium of the respective rollers; Fig. 11 is a detail vertical longitudinal section to an enlarged scale of the device shown in Fig. 1 for stripping the tails of shrimp, and portions of gripping fingers being illustrated in engaged relation with the shrimp; the section of Fig. 11 being taken substantially on line 11—11 of Fig. 12; and Fig. 12 is a horizontal section on line 12—12 of Fig. 11.

In said drawings, the reference numeral 5 represents, generally, the frame of the machine comprising two laterally spaced apart members 6. Journaled in bearings provided in said members are shafts 7 and 8 upon which are rigidly mounted sprocket wheels 9 and 10 for an endless sprocket chain 11 having between the wheels upper and lower leads $11^1$ and $11^2$ disposed horizontally, or nearly so. Said chain is driven in the direction indicated by the arrow A in Fig. 1 by means of a power driven belt 12 passing about a pulley 13 on the shaft 7.

Secured to or formed integral with links of said chain are fish carriers 14 carrying devices for regulating the positions of the fish suitable to be operated upon by the tail strippers to be presently described. Each of said carriers is provided centrally of its width with a longitudinally disposed vertical web element 15 provided at its upper and lower edges with side flanges 16 and 17, respectively, the lower of said flanges bearing upon supporting elements 18 and 19 of the frame members.

20 represent guide bars secured to the upper supports 18 and provided with ways 21 (Fig. 2) to prevent uplifting of the carriers when travelling with the upper lead of the chain.

The upper of said flanges 16 are provided with transversely arranged slots 22 serving as guide ways for the shanks 23 of two groups of blocks 24 mounted upon the upper surfaces of the respective flanges.

Secured to the under side of each of the block shanks 23 is a transversely arranged arm 25 having depending from near its outer end a stud 26 which serves as an axle for a roller 27, one for each of the blocks 24. Secured to the frame, in the path of the rollers when travelling with the upper lead of said chain, is a pair of transversely spaced guide bars 28 having relatively opposed inner surfaces which as at 28¹ converge, see Figs. 7 and 10, from their forward ends rearwardly to parallel surfaces 28². Such surface arrangement of the guide bars 28 act against the rollers to cause the respective blocks of the groups thereof at opposite sides of the medial vertical plane of the machine to, first, be progressively moved toward each other, as illustrated at the left hand side of Fig. 10, and thence be held in parallel, as at the right hand side of the view.

When the carriers are in their inverted positions during their return travel in the lower lead of the chain, guide bars 29, Figs. 2 and 8, provided on the frame and having relatively diverging surfaces 29¹ which are utilized to engage the rollers to effect the spreading apart of the respective complementary blocks.

Each of the blocks 24 is provided at its inner end with a movable jaw element 30 having a stem 31 (Fig. 3) extending through the respective block and yieldingly held in spaced relation therefrom by means of a spring 32 extending into a chamber of the block; the movement of a jaw from its block being regulated by a pin 33 provided in the stem acting as a stop with regard to the block.

The jaws 30 bear upon the upper surface of the flanges 16, and are characterized by having their inner ends—that is, the ends toward the longitudinal axis of the machine—formed each, as shown in Fig. 3, of an angular shape to provide at its midheight a protruding nose 34 with sloping faces 35 and 36 above and below the nose.

The elevation of a nose 34 above the plane of the top surface of the flanges 16 of a carrier is, moreover, less than one-half of the maximum breadth of a shrimp which is designed to be operated upon in the machine.

A chute, represented by 37 in Fig. 1, is employed to feed shrimp successively upon the carriers 14 of the upper lead 11¹ and between the jaws 30 of the blocks 24 prior to the rollers associated therewith reaching the controlling bars 28 which act to move the blocks into operative relation with the shrimp.

A shrimp deposited upon a carrier between the opposing jaws thereof is engaged by the jaws as they are brought toward each other by means of the rollers 27 when influenced by the bar surfaces 28¹, see Fig. 10, in the progress of the respective carriers 14 with the upper chain lead 11¹. The two series of opposing jaws approaching each other from the opposite sides of the carrier, present the lower faces 36 to the narrow tail portion of the shrimp thereon and the upper jaw faces 35 to the wider head end or body portion of the shrimp.

Under such a condition, further movement of both series of jaws, cause the tail of the shrimp to be engaged beneath the noses of the jaws at one or the other side of the carrier and the thicker body portion to be directed upwardly upon the sloping faces 35 of the other series of jaws. A further travel of the carrier brings the rollers thereof into the contracted space between the parallel surfaces 28² of the bars 28 resulting in the shrimp's tail being seized by the noses of both series of jaws and its body portion elevated.

The function described above of the jaws will be understood from an inspection of Fig. 3, wherein a shrimp in a recumbent position on a carrier is indicated by dotted lines $S^1$ and in its body elevated position by dotted lines $S^2$.

The main purpose of the carrier devices is that described above—which is, to elevate the body of shrimp into position to be engaged by body grasping means of a conveying system which will now be explained.

Such conveying system comprises an endless chain 40 passing about sprocket wheels 41 and 42 having shafts 43 and 44 journaled in the upper portion of the machine frame to provide horizontal leads 40¹ and 40². As shown, the conveyor is driven by means of chains and sprocket wheels indicated diagrammatically by dot-and-dash lines in Fig. 1, wherein 45 is a sprocket wheel on the shaft 8 for a chain 46 which passes about a sprocket wheel 47 on an intermediate shaft 48, and from a sprocket wheel, as 47, is driven a second chain 49 which passes about an idler 50 and engages a sprocket wheel 51 on the conveyor driving shaft 44.

Attached to links of the conveyor chain are groups of fingers 52 which in the lower lead 40² of the chain depend therefrom so that the free ends of the fingers travel in close proximity to the tops of the block and jaw devices of the carriers when in the upper lead. The fingers 52 are of spring metal arranged as shown in Fig. 2, that is to say, in complementary groups at each side of a vertical longitudinal plane disposed at the midwidth of the machine.

As shown in Fig. 2, the fingers 52 are secured to opposite sides of ribs elements such as 53¹ of supporting plates 53 which travel in ways 54 provided in guide elements 55 of the frame structure. Said fingers are normally distended transversely of the machine so that space between the opposing fingers will be afforded for the shrimp bodies when in an elevated position, as hereinbefore explained.

The fingers are, however, brought into engaging relation with the body of a shrimp in the further travel of the same with the lead 40² by means of controlling bars 56 having relatively converging surfaces 56¹ (Fig. 9) which cause the fingers to be brought into engaging relation with a shrimp body as indicated by dotted line 52¹ position of a pair of fingers with respect to a shrimp which is denoted by S².

When the fingers reach the end of the inclined surfaces 56¹ they are held in engaged relation with the shrimp by the parallel surfaces 56² of said bars. The speed of the conveyor chain for the fingers corresponds with the speed of the carriers, so that a shrimp will be carried by both until it reaches the end of its horizontal travel with the upper lead of the chain 11.

Means for stripping the shell from the tails of shrimp is shown in Figs. 1, 11, and 12, comprising a rotary member 60 mounted upon a shaft 61 which is driven by means of an endless chain 62 passing about sprocket wheels upon the shafts 8 and 61, respectively.

Said member 60 consists of two rubber disks 63 secured in side by side relation upon a hub 64 which is rigid with the shaft 61 and disposed, as shown in Figs. 1 and 11, to have its periphery revolve within close proximity to the lower ends of the fingers 52.

The disks 63 are regulated by means of a separator 65 having a wedge shaped portion 66 extending into the interstice between the disks at one side of the latter to spread the same apart to receive the tail of a shrimp between the disks.

At the diametrically opposite side of the disks from said separator is a pair of companion plates 67 which cooperate with the resiliency of the disks to cause the disks to be brought into clamping relation with the tail of the shrimp.

The operation of the devices above described for grasping the tail of a shrimp for removing the shell therefrom will be understood from Fig. 11, wherein S³ represents a shrimp held in a travelling group of fingers 52 with its tail inserted between the disks, and S⁴ represents the body of the shrimp in its further travel after the shell of the tail, which is indicated by T, has been removed from the body.

After being relieved of its tail shell the body is carried by the fingers 52 until the same have passed beyond the bars 56 whereupon the resiliency of the fingers cause them to open to permit the body to be discharged upon a belt or conveyor 68 to be carried from the machine to be further acted upon. 69 represents a pulley for the belt 68.

The construction and operation of the invention will, it is thought be understood from the foregoing description.

What we claim, is,—

1. In a fish-cleaning machine, the combination with the machine frame, two endless chains arranged longitudinally of the frame one above the other, sprocket wheels for said chains, and means for rotating said wheels to drive the respective chains, of carriers carried by the lower of said chains, means to deposit fish successively upon said carriers, normally open resilient fish-gripping fingers carried by the upper of said chains, means rendered operable by the travel of the fingers to operate the latter, and means provided upon the respective carriers and actuated by the travel of the carriers for elevating the fish into position to be engaged by said fingers.

2. In a fish-cleaning machine, the combination with the machine frame, of fish tilting and tail engaging devices, fish body gripping devices disposed above the first named devices, means for effecting the travel of both of said devices longitudinally of the frame, and means actuated by the travel of the respective devices to operate the same successively.

3. In a fish-cleaning machine, a plurality of fish carriers arranged for movement longitudinally of the machine, means to effect said movement of the carriers, opposing jaw devices mounted upon the respective carriers for relative closing and opening movement transversely of the machine, means to feed fish upon the carriers successively and between the jaws associated therewith when the latter are in their relatively open positions, said jaws being adapted in their closing movement toward each other to effect the elevation of the bodies of fish from the respective carriers, finger devices travelling longitudinally of the machine for gripping the elevated body portions of the fish, and revoluble means adapted for gripping the tail portions of fish depending from said fingers and cooperating with the latter for stripping the shell from the tail portions of the respective fishes.

4. In a fish-cleaning machine, the combination with the machine frame, of a carrier arranged therein for longitudinal movement, fish tilting and tail gripping jaws mounted upon the carrier for lateral movement, and means rendered operable by the travel of the carrier for actuating the jaws to successively tilt and grip the fish.

5. In a fish-cleaning machine, the combination with the machine frame, fish carriers thereon, means to impart movement to said carriers longitudinally of the machine, and means to deposit fish upon the successive carriers, of series of opposing jaws provided upon the respective carriers and arranged for reciprocatory movement transversely of the machine, devices actuated by the travel of said carriers for effecting the reciprocatory movement of said jaws, each of said jaws having a protuberance intermediate its height and diverging surfaces above and below the same.

6. In a fish-cleaning machine as defined in claim 5 wherein springs are included in the devices which transmit reciprocatory movement to the jaws.

7. In a fish-cleaning machine, the combination with the machine frame and a carrier provided thereon for movement longitudinally of the frame, of blocks slidable upon the carrier transversely of the frame, spring pressed fish-tilting jaws carried by the respective blocks, guide bars provided on said frame, and means connected to said blocks and rendered operable by said guide bars in the travel of the carrier for moving the jaws successively into and from their fish tilting relation.

8. In a fish cleaning machine, the combination with the machine frame and a carrier provided thereon for movement longitudinally of the frame, of blocks slidable upon the carrier transversely of the frame, fish-tilting jaws carried by the respective blocks, guide bars provided on said frame, and means connected to said blocks and rendered operable by said guide bars in the travel of the carrier for moving the jaws successively into and from their fish tilting relation.

9. In a fish-cleaning machine, the combination with the machine frame and a carrier provided thereon for movement longitudinally of the frame, of blocks slidable upon the carrier transversely of the frame, spring pressed fish-tilting jaws carried by the respective blocks, guide bars provided on said frame, and means rendered operable by said guide bars in the travel of the carrier for moving the jaws successively into and from their fish tilting relation.

10. In a fish-cleaning machine, the combination with the machine frame and a carrier provided thereon for movement longitudinally of the frame, of fish tilting devices carried by said carrier, said devices being arranged for movement transversely of the machine, means rendered operable by the travel of said carrier for moving the devices into fish-tilting position.

11. In a fish-cleaning machine, the combination with the machine frame and a carrier provided thereon for movement longitudinally of the frame, of blocks slidable upon the carrier transversely of the frame, spring pressed fish-tilting jaws carried by the respective blocks, guide bars provided on said frame, and means rendered operable by said guide bars in the travel of the carrier for moving the jaws into their fish tilting relation.

12. In a fish-cleaning machine, the combination with the machine frame, means for gripping the body portion of a fish to have the tail portion in depending relationship thereto, and means for effecting the travel of said gripping means longitudinally of the frame, of a rotary tail gripping device comprising a pair of resilient disks disposed in side by side relation, means to rotate said disks, means acting between the disks to spread apart the same at one side of their axis of rotation to provide tail receiving opening thereat, and means provided in spaced relation circumferentially of the disks to force the same into engageable relation with the fish.

13. In a fish cleaning machine, the combination with the machine frame, fish tilting devices, fish body gripping devices, and means for effecting the travel of both of said devices longitudinally of the frame, of revoluable means adapted for gripping the tail portions of fish depending from said body gripping devices and cooperating therewith for stripping the shell from the tail portions of the fish.

14. In a fish cleaning machine, in combination with the machine frame, of fish tilting devices, fish body gripping devices, and means for effecting the travel of both of said devices to operate the same.

15. In a fish cleaning machine, means for gripping the body portion of a fish to have the tail portion in depending relationship thereto, and revoluble means adapted for gripping from body gripping means and cooperable therewith for stripping the shell from the tail portion of the fish.

VIGGO BOTTKER.
BJARNE GRONDAHL.